Dec. 26, 1967   N. K. BASILE ET AL   3,359,745
SYSTEM FOR PROTECTING NON-CRYOGENIC MATERIAL
FROM LOW TEMPERATURES AND CONTROLLING
LIQUEFIED GAS BOIL-OFF RATE

Filed April 19, 1966   2 Sheets-Sheet 1

INVENTORS
Norman K. Basile
Donald R. Yearwood

BY Stevens, Davis, Miller & Mosher
ATTORNEYS

Dec. 26, 1967 N. K. BASILE ET AL 3,359,745
SYSTEM FOR PROTECTING NON-CRYOGENIC MATERIAL
FROM LOW TEMPERATURES AND CONTROLLING
LIQUEFIED GAS BOIL-OFF RATE
Filed April 19, 1966 2 Sheets-Sheet 2

INVENTORS
Norman K. Basile
Donald R. Yearwood
BY
ATTORNEYS

3,359,745
SYSTEM FOR PROTECTING NON-CRYOGENIC MATERIAL FROM LOW TEMPERATURES AND CONTROLLING LIQUEFIED GAS BOIL-OFF RATE

Norman K. Basile, Bronx, and Donald R. Yearwood, Brooklyn, N.Y., assignors to John J. McMullen, Montclair, N.J.
Filed Apr. 19, 1966, Ser. No. 543,664
5 Claims. (Cl. 62—45)

ABSTRACT OF THE DISCLOSURE

An arrangement for storing or transporting liquefied gases at cryogenic temperatures within a cryogenic free standing tank surrounded by non-cryogenic supporting structure spaced from the tank to form a void space therebetween. The arrangement includes a system for protecting atmospheric conditions within the void space comprising a supply duct and a return duct spaced from each other and arranged within the void space and a series fan and heat exchanger coupled from the return duct to the supply duct in order to circulate and change the temperature of the gas within the void space. The system is versatile in that it includes a valve which can be opened to deliver the fan outlet to the atmosphere while another gas supply control valve is opened to inert or air flush the void space. In addition, a gas detector is located in the single return line so that the presence of gas therein, normally within the outer tank barrier, which is of a different type from the heat exchanger fluid medium and void space atmosphere, represents a leak condition in the outer tank barrier.

---

The present invention relates to a gas circulating system used with liquefied gas storage tanks and more particularly to a system for controlling the temperature and atmospheric conditions within the void space surrounding the outer barrier of a liquefied gas storage tank.

Because of the extremely low temperature of liquefied gas at about ambient pressure, tanks storing the same are generally made of special materials which retain their structural capabilities at low temperatures, but it is common to surround the tank with a supporting structure of mild steel which cannot withstand low temperatures. The space between the outer tank walls and the supporting structure is known in the art as the void space, and in the case of tankers, the supporting structure includes the hull inner structure. The tank normally includes a double barrier arrangement with the liquid cargo held in the inner tank. Insulation is provided on the inner hull or alternately is hung on the outer tank within the void space.

As will be appreciated, cracks occurring in the tank may enable cold liquid or gas to reach the ship structure. In this event, the ship's hull may rupture with serious consequences. It is a purpose of the present invention to prevent the ship's structure from assuming a cold temperature by circulating the gas in the void space through a heat exchanger to keep the temperature therein relatively high when cold gas or liquid leaks from the outer tank wall. The present invention also maintains a uniform temperature in the void space and controls the temperature therein to minimize the thermal gradients in the tank structure, and to protect the inner hull structure during periods of low outside ambient.

When transporting liquefied methane and the like, the natural boil-off is normally fed to the boilers and used as fuel to supplement the conventional marine fuels. However, the natural boil-off rate may not be adequate to permit boiled-off methane vapor to provide all the required ship's power. In this case, the additional power required is generally obtained by burning a portion of marine fuel.

It is another purpose of the present invention to control the temperature of the void space which affects the heat transfer into the liquid cargo and thus controls the boil-off rate. This rate can then be increased to meet the ship's total fuel requirements.

The system of the present invention can also be used to inert the void space and to detect leaks in the secondary barrier. Humidity control is also achieved by changing the atmosphere within the void space.

Briefly stated, the present invention comprises a circulating fan which draws from the void space through a single line which communicates with a system of return distribution ducts. The fan discharges the gas through a heat exchanger, a single delivery line and out through a system of supply distribution ducts located within the void space. Valved lines are provided to selectively feed the fan output to the atmosphere and deliver flue gas or pure air to the delivery line. According to one feature of the invention, a standard gas detector is provided in the return line to detect the presence of cargo gas within the void space.

It is therefore an object of the present invention to provide a system for controlling the temperature of the gas within the void space of the systems of the type described.

It is a further object of the present invention to provide a system for increasing the boil-off rate of liquefied gas within a storage tank by circulating the atmosphere in the void space through a heat exchanger.

It is another object of the present invention to provide a system for detecting leaks in the secondary barrier of a liquefied gas storage tank by drawing the atmosphere of the void space through a return pipe which is provided with a gas detection device.

It is still a further object of the present invention to provide a system for inerting or air purging the void space of the tanks of the type described and controlling the humidity of this space by changing the atmosphere therein.

Other and further objects of the present invention will become apparent with the following detailed description when taken in view of the appended drawings in which.

Figure 1:
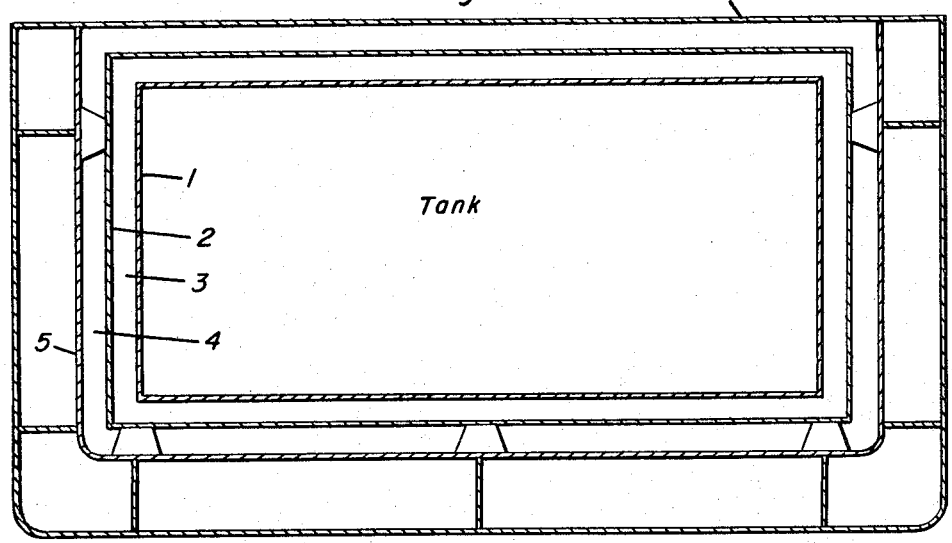
FIG. 1 is a schematic illustration of a vertical transverse section taken through the hull of a liquefied gas tanker.
Figure 3:
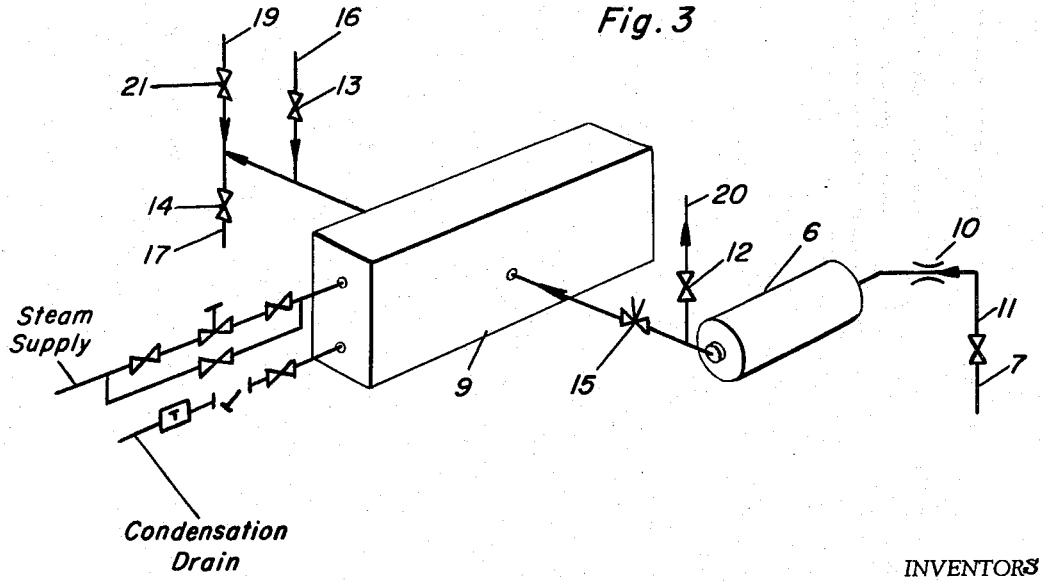
FIG. 3 is a diagrammatic illustration of the fan, heat exchanger, gas detector and valve system of the present invention.
Figure 2:
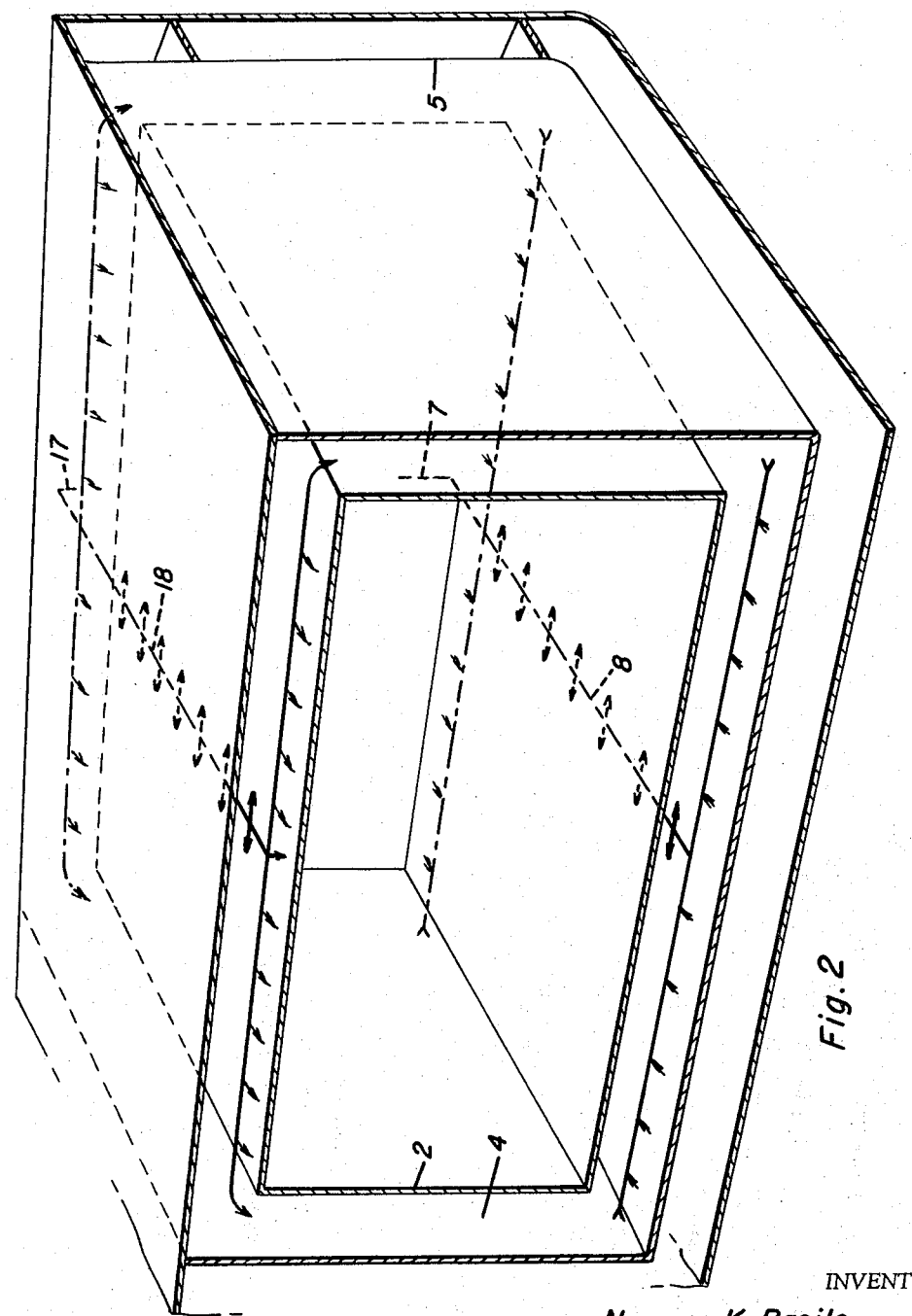
FIG. 2 is a schematic perspective illustration of the delivery and return headers of the present invention showing their relation to the tank and ship structure.

With reference to the drawings in detail, ship 30 is provided with an inner hull 5, an outer barrier 2 supported and spaced from hull 5 by a plurality of pillars, and an inner barrier 1 spaced everywhere from the outer barrier 2. The inner barrier 1 is at least partially filled with liquid cargo such as liquefied methane, propane, ethylene, and the like. The outer tank space 3 contains an atmosphere of inert gas or cargo gas, and the void space 4 is filled with an atmosphere of inert gas or air.

A system of supply distribution ducts 18 is arranged at the top of the void space 4 and a system of return distribution ducts is arranged at the bottom of the void space. With this arrangement, the entire atmosphere of the void space can be quickly and completely circulated from the supply and return distribution ducts 18 and 8. The return ducts 8 communicate with a single return line 7 which feeds through valve 11 to the intake of fan 6. A conventional gas detector 10 is provided in line 7 for purposes to be discussed below.

The output of fan 6 can be directed through valve 12 to the atmosphere or alternately through valves 15 to a conventional heat exchanger 9. An air supply such as the ambient feeds through valve 21 into the output line of heat exchanger 9. Similarly, an inert gas supply 16 feeds through valve 13 into the output side of heat exchanger 9. The inert gas supply can be flue gas from the ship's boiler, a source of nitrogen gas, or any other suitable inert gas supply.

The heat exchange output line feeds through valve 14 into a delivery line 17 which feeds the supply distribution duct system 18.

The present system operates as follows to protect the ship's inner hull structure from low temperatures when leaks occur in the liquefied cargo tanks or during periods of low outside ambient temperature. The method of operation is the same for ships with insulation on the inner hull structure and insulation hung on the outside of outer barrier 2. During normal operation, the gas within the void space 4 is generally at a relatively high temperature, approximately 0° F., to maintain the toughness of the ship's hull structure within acceptable limits. In the event the insulation fails or a crack develops in the primary or secondary barrier, or during periods of low outside ambient temperature, the gas in the void space 4 is cooled by the heat transfer or the entering leaking gas.

The system of the present invention maintains the ship's structure at an acceptable temperature by energizing fan 6 which takes suction from the void space 4 to line 7 and ducts 8. The fan feeds the heat exchanger 9 and the heated gas is returned to the void space 4 via line 17 and ducts 18. In this way, the system provides temperature protection for the ship's structure 5.

The present system operates to control the liquid boil-off rate by circulating the gas in the void space through fan 6 and heating the same in heat exchanger 9 and feeding the heated gas back through delivery line 17 into the void spaced. All or a portion of the heat added to the gas by fan 6 and heat exchanger 9 transfers to the liquid cargo, thus increasing the boil-off rate. The boil-off is trapped in the conventional manner and fed to the ship's boilers as fuel. According to the present invention, the boil-off rate can be increased to meet the total fuel requirements for the ship.

A leak in the secondary barrier may also be detected by the system of the present invention. This is accomplished by circulating the void space atmosphere through line 7 by energizing fan 6 and recirculating the atmosphere through delivery line 17. As the atmosphere circulates, gas detector 10 detects those gases which indicate leaks in the barrier system. With this arrangement, the need for a large number of gas detectors located at various points in the void space is eliminated.

In order to prevent the formation of a combustible vapor in the void space 4 in the event methane leaks into this space, the present system displaces with an inert gas all air initially contained in this space. This system is also capable of performing or assisting in the inerting operation. Fan 6 is started, valve 11 is opened and the fan thus takes suction from the void space 4. Valve 12 is opened and the fan will then discharge to the atmosphere 20. Valves 13 and 14 are then opened and valve 15 remains closed. Thus, inert gas is admitted through the inert gas supply line 16 to the void space. After all air is displaced from the void space, the operation is terminated and the inert gas is locked in the void space.

The system may also be used to displace the inert gas with air when it is desirable to have a life supporting atmosphere in the void space. In this case, the operation is similar to that described for inerting, except that valve 13 remains closed and valve 21, admitting air through line 19, is opened.

In the event a leak occurs in the ship's structural tank bulkheads 5, moisture will be introduced into the void space 4. This system permits control of humidity in void space by changing void space atmosphere in the manner described.

Thus there has been described a system for controlling the temperature and atmospheric conditions within the void space outside of a liquefied gas storage tank. It should be understood that various modifications can be made to the herein disclosed example of the present invention without departing from the spirit and scope thereof.

What is claimed is:

1. An arrangement for storing liquefied gas comprising a free standing liquefied gas storage tank, a non-cryogenic structure surrounding said tank and spaced therefrom to form a void space between said tank and structure, a system for controlling atmospheric conditions within the void space comprising a supply duct and a return duct spaced from each other and arranged within the void space, a fan and a heat exchanger coupled in series from the return duct to the supply duct in order to circulate and change the temperature of the gas within the void space, and further comprising first valve means connected to the fan output to deliver to the atmosphere the gas moving through the fan, and second valve means coupled to the supply duct for delivering thereto a supply of gas which is different from the gas initially within the void space.

2. An arrangement for storing liquefied gas comprising a free standing liquefied gas storage tank, a non-cryogenic structure surrounding said tank and spaced therefrom to form a void space between said tank and structure, a system for controlling atmospheric conditions within the void space comprising a supply duct and a return duct spaced from each other and arranged within the void space, a fan and a heat exchanger coupled in series from the return duct to the supply duct in order to circulate and change the temperature of the gas within the void space, and wherein a return line is coupled from the return duct to the fan input and a gas detecting and analyzing device is attached to the return line to indicate the presence of certain ones of predetermined gases and wherein the medium for the heat exchanger is a different type fluid from the contents of the tank so that indication of the presence of tank fluid by said gas detecting and analyzing device indicates a leak in the tank.

3. A method of protecting from low temperature the mild steel supporting structure about a free standing liquefied gas storage tank wherein a gas filled void space is provided between the tank outermost low temperature barrier and the innermost mild steel supporting structure, comprising drawing void space gas and feeding the same to a heat exchanger, heating the gas therein and returning the heated gas to said void space and thus applying heat to the mild steel walls thereof.

4. A method of delivering fuel to a utilization device from a liquefied gas storage tank wherein a gas filled void space is provided about the tank, said void space being defined as bounded by the outermost low temperature tank barrier and the innermost surrounding mild steel supporting structure, the method comprising collecting the liquefied gas boil-off and feeding the same to the utilization device, and controlling the boil-off rate by selectively heating said void space gas to increase the heat transfer into the liquefied gas.

5. A method of detecting a leak in the outer barrier of a liquefied cargo tank about which there is provided a void space, the method comprising introducing into the void space gas of a type different from the gas within the outer barrier, circulating the gaseous atmosphere within said void space through a line, and analyzing the gas passing through said line and detecting and indicating the presence of any gas of the type which should normally be within the outer barrier thus indicating a leak condition in the outer barrier.

References Cited

UNITED STATES PATENTS

| 2,927,437 | 3/1960 | Rae | 62—55 |
| 3,050,951 | 8/1962 | Gebein | 62—45 |
| 3,110,156 | 11/1963 | Niemann | 62—45 |

FOREIGN PATENTS 888,247   1/1962   Great Britain.

LLOYD L. KING, *Primary Examiner.*